United States Patent
Huang

(10) Patent No.: US 10,574,749 B2
(45) Date of Patent: Feb. 25, 2020

(54) CLOUD SERVER AND DIGITAL RESOURCE DUPLICATION METHOD AND SYSTEM

(75) Inventor: Jinxu Huang, Xiamen (CN)

(73) Assignee: Xiamen Geeboo Information Technology Co. Ltd. (CN)

( * ) Notice: Subject to any disclaimer, the term of this patent is extended or adjusted under 35 U.S.C. 154(b) by 915 days.

(21) Appl. No.: 14/779,483

(22) PCT Filed: Jul. 3, 2012

(86) PCT No.: PCT/CN2012/078128
§ 371 (c)(1),
(2), (4) Date: Sep. 23, 2015

(87) PCT Pub. No.: WO2014/005287
PCT Pub. Date: Jan. 9, 2014

(65) Prior Publication Data
US 2016/0080494 A1   Mar. 17, 2016

(51) Int. Cl.
*G06F 15/16* (2006.01)
*H04L 29/08* (2006.01)

(52) U.S. Cl.
CPC ...... *H04L 67/1097* (2013.01); *H04L 67/1095* (2013.01)

(58) Field of Classification Search
CPC ..... H04L 67/00; H04L 63/00; H04L 67/1095; H04L 67/1097
(Continued)

(56) References Cited

U.S. PATENT DOCUMENTS 7,668,830 B2 * 2/2010 Hakala ............... G06F 21/6218
713/154
2001/0047348 A1 * 11/2001 Davis ..................... G06F 16/40
(Continued)

FOREIGN PATENT DOCUMENTS

CN   101313327 A   11/2008
CN   101355569 A   1/2009
(Continued)

OTHER PUBLICATIONS

T. Davies and M. D. Mintz, "Relational access control with bivalent permissions in a social Web/collaboration architecture," 2010 International Symposium on Collaborative Technologies and Systems, Chicago, IL, 2010, pp. 57-66.*

Guides, E. (1980). The design of a cryptography based secure file system. IEEE Transactions on Software Engineering, SE-6(5), 411-20. doi:http://dx.doi.org/10.1109/TSE.1980.230489, p. 411-20.*

(Continued)

*Primary Examiner* — Oscar A Louie
*Assistant Examiner* — Messeret F Gebre
(74) *Attorney, Agent, or Firm* — Lerner, David, Littenberg, Krumholz & Mentlik, LLP

(57) ABSTRACT

In a digital resource duplication method, the cloud server executes: a receiving step, for receiving a duplication request for a digital resource submitted by a resource requester, the duplication request comprising the identification information of the resource requester, the unique resource copy identifier, and the unique terminal identifier; a determination step, for determining, on the basis of the identification information, whether the resource requester is allowed to duplicate via the terminal a copy of the digital resource corresponding to the unique resource copy identifier; a transmitting step, for transmitting the copy to the terminal after embedding the unique terminal identifier and the identification information in the copy, when a determination result of the determination step is positive. The present invention can prevent the digital resource from being duplicated from a legitimate terminal to an illegitimate terminal for use, thereby effectively controlling the illegal duplication of digital resources between terminals.

6 Claims, 2 Drawing Sheets

(58) Field of Classification Search
USPC .................................................. 709/219, 221
See application file for complete search history.

(56) References Cited

U.S. PATENT DOCUMENTS

| | | | |
|---|---|---|---|
| 2002/0078439 A1* | 6/2002 | Yamaga | H04N 21/6581 725/1 |
| 2004/0078338 A1* | 4/2004 | Ohta | G06F 21/10 705/51 |
| 2004/0103303 A1* | 5/2004 | Yamauchi | G06F 21/10 726/33 |
| 2005/0138082 A1 | 6/2005 | Rauma et al. | |
| 2005/0197963 A1 | 9/2005 | Raley et al. | |
| 2009/0183010 A1 | 7/2009 | Schnell et al. | |
| 2012/0200951 A1* | 8/2012 | Koda | G11B 20/10 360/15 |
| 2013/0242324 A1* | 9/2013 | Miyazaki | H04N 1/00244 358/1.13 |

FOREIGN PATENT DOCUMENTS

| | | |
|---|---|---|
| CN | 101911087 A | 12/2010 |
| CN | 102118447 A | 7/2011 |
| CN | 102394869 A | 3/2012 |

OTHER PUBLICATIONS

M. Wu, Y. Zhang and Z. Wan, "Application of Component-Based Permission Control in MIS," 2009 First International Conference on Information Science and Engineering, Nanjing, 2009, pp. 1676-1679.*

W. Enck, M. Ongtang and P. McDaniel, "Understanding Android Security," in IEEE Security & Privacy, vol. 7, No. 1, pp. 50-57, Jan.-Feb. 2009.*

International Search Report for Application No. PCT/CN2012/078128 dated Apr. 11, 2013.

* cited by examiner

US 10,574,749 B2

CLOUD SERVER AND DIGITAL RESOURCE DUPLICATION METHOD AND SYSTEM

CROSS-REFERENCE TO RELATED APPLICATIONS

The present application is a national phase entry under 35 U.S.C. § 371 of International Application No. PCT/CN2012/078128 filed Jul. 3, 2012, which is hereby incorporated herein by reference.

FIELD OF THE INVENTION

The present disclosure relates to the technical field of digital resource communication, and particularly to a cloud server, and a digital resource duplication method and system.

BACKGROUND OF THE INVENTION

With the development of information technology and the popularity of mobile internet, digital resources are playing an increasingly important role in people's daily life and work by virtue of their desirable characteristics, such as high-tech contents, environmental friendliness, and portability. Under such circumstances, various kinds of digital resource platforms are emerging.

However, with respect to the duplication of the digital resources (including but not limited by audio, videos, electronic readings such as newspapers and periodicals, magazines, as well as books, games, software, practical information, or the combination of the above) in the prior art, on the one hand, the duplication number cannot be controlled from the source end, and on the other hand, the illegitimate duplication cannot be controlled from the terminal end. Especially, with the development of technologies, there are more and more hardware terminals through which the users can read digital resources, and the operating platforms (such as the iOS system, the android system, the windows system, etc.) used by various hardware terminals are different from one another. At present, there is not a precise and low cost technique through which digital resources can be circulated and transmitted among terminals with different operating platforms.

SUMMARY OF THE INVENTION

The technical problem to be solved by the present disclosure is to eliminate the illegitimate duplication of a digital resource.

In order to solve the aforesaid technical problem, the present disclosure provides a method for duplicating a digital resource, comprising the following steps executed by a cloud server:

receiving, in a receiving step, a duplication request for a digital resource submitted by a resource requester via a terminal, the duplication request comprising identification information of the resource requester, a unique resource copy identifier, and a unique terminal identifier;

determining, in a determination step, on the basis of the identification information, whether the resource requester is allowed to duplicate via the terminal a copy of the digital resource corresponding to the unique resource copy identifier; and transmitting, in a transmitting step, the copy to the terminal after embedding the unique terminal identifier and the identification information in the copy, when a determination result of the determination step is positive.

Preferably, the determination result of the determination step is positive when it is determined that the resource requester has a duplication right to the digital resource corresponding to the unique resource copy identifier based on the identification information, and that a number of copies of the unique resource copy identifier is less than a pre-set duplication threshold thereof, the number of copies being a number of terminals in which the copies of the digital resource corresponding to the unique resource copy identifier are stored currently; and the method further comprises updating, in an updating step, if the copy is transmitted to the terminal, information relating to the number of terminals in which the copies of the digital resource corresponding to the unique resource copy identifier are stored currently.

Preferably, the method further comprises recording, in a recording step, if the copy is transmitted to the terminal, the unique terminal identifier, or the unique terminal identifier and at least one of the identification information and a current time.

Preferably, the method further comprises commanding, by the cloud server, when the cloud server receives a returning request submitted by the resource requester via the terminal for returning the copy to a cloud end, the terminal to delete the copy stored therein; and updating the information relating to the number of terminals in which the copies of the digital resource corresponding to the unique resource copy identifier are stored currently.

The present disclosure further provides a cloud server, comprising a receiving module, a determination module, an embedding module, and a transmitting module, wherein the receiving module is used for receiving a duplication request for a digital resource submitted by a resource requester via a terminal, the duplication request comprising identification information of the resource requester, a unique resource copy identifier, and a unique terminal identifier;

wherein the determination module is used for determining, on the basis of the identification information, whether the resource requester is allowed to duplicate via the terminal a copy of the digital resource corresponding to the unique resource copy identifier;

wherein the embedding module is used for embedding the identification information and the unique terminal identifier in the copy when it is determined by the determination module that the resource requester is allowed to duplicate the copy of the digital resource corresponding to the unique resource copy identifier via the terminal; and wherein the transmitting module is used for transmitting the copy to the terminal.

Preferably, the determination module comprises a first determination unit, and one of a second determination unit and a third determination unit, wherein the first determination unit is used for determining whether the resource requester has a duplication right to the digital resource based on the identification information;

wherein the second determination unit is used for determining whether the resource requester is allowed to duplicate the copy via the terminal; and wherein the third determination unit is used for determining whether a number of copies of the unique resource copy identifier is less than a pre-set duplication threshold thereof, the number of copies being a number of terminals in which the copies of the digital resource corresponding to the unique resource copy identifier are stored currently.

Preferably, the cloud server further comprises an updating module, used for updating, if the copy is transmitted to the terminal, information relating to the number of terminals in which the copies of the digital resource corresponding to the unique resource copy identifier are stored currently.

Preferably, the cloud server further comprises a recording module, used for recording, when the transmitting module transmits the copy to the terminal, the unique terminal identifier, or the unique terminal identifier and at least one of the identification information and a current time.

Preferably, the cloud server further comprises a returning module, used for commanding, when a returning request submitted by the resource requester via the terminal for returning the copy to a cloud end is received, the terminal to delete the copy stored therein, and updating the information relating to the number of terminals in which the copies of the digital resource corresponding to the unique resource copy identifier are stored currently, wherein the receiving module is used for receiving the returning request submitted by the resource requester via the terminal.

According to another aspect, the present disclosure further provides a duplication system of a digital resource, comprising a terminal and a cloud server, wherein the terminal is used for receiving a duplication request for a digital resource submitted by a resource requester to the cloud server and transmitting the duplication request to the cloud server, the duplication request comprising identification information of the resource requester, a unique resource copy identifier, and a unique terminal identifier; and wherein the cloud server is used for determining, after receiving the duplication request, on the basis of the identification information, whether the resource requester is allowed to duplicate via the terminal a copy of the digital resource corresponding to the unique resource copy identifier, embedding the identification information and the unique terminal identifier in the copy and transmitting the copy to the terminal when a determination result is positive.

Preferably, the cloud server is used for determining that the resource requester is allowed to duplicate the copy of the digital resource corresponding to the unique resource copy identifier via the terminal when the resource requester has a duplication right to the digital resource, and a number of copies of the unique resource copy identifier is less than a pre-set duplication threshold thereof, the number of copies being a number of terminals in which the copies of the digital resource corresponding to the unique resource copy identifier are stored currently.

Preferably, the cloud server is further used for updating, if the copy is transmitted to the terminal, information relating to the number of terminals in which the copies of the digital resource corresponding to the unique resource copy identifier are stored currently.

Preferably, the cloud server is further used for recording, when the copy is transmitted to the terminal, the unique terminal identifier, or the unique terminal identifier and at least one of the identification information and a current time.

Preferably, the cloud server is used for updating information relating to the number of terminals in which the copies of the digital resource corresponding to the unique resource copy identifier are stored currently based on a returning request submitted by the resource requester; and the terminal is used for receiving the returning request submitted by the resource requester to the cloud server and transmitting the returning request to the cloud server.

Compared with the prior art, the digital resources being duplicated from a legitimate terminal to an illegitimate terminal for use can be prevent by the embodiments of the present disclosure, whereby the illegal duplication of digital resources between terminals can be controlled effectively. According to the embodiments of the present disclosure, not only the digital resources can be circulated and transmitted among terminals with different operating platforms, but also the security and controllability of the digital resources can be ensured.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the technical solution of the present disclosure together with the embodiments, not for limiting the technical solution of the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

First, as long as there is no conflict, all the technical features mentioned in all the embodiments may be combined together in any manner, and the technical solutions obtained in this manner all fall within the scope of the present disclosure. In addition, the steps as shown in the flow chart can be executed in a computer system by a group of computer executable instructions. Although a certain logical sequence is shown in the flow chart, the steps shown or described herein can be executed in other sequences different from the one shown herein in some cases.

Figure 1:
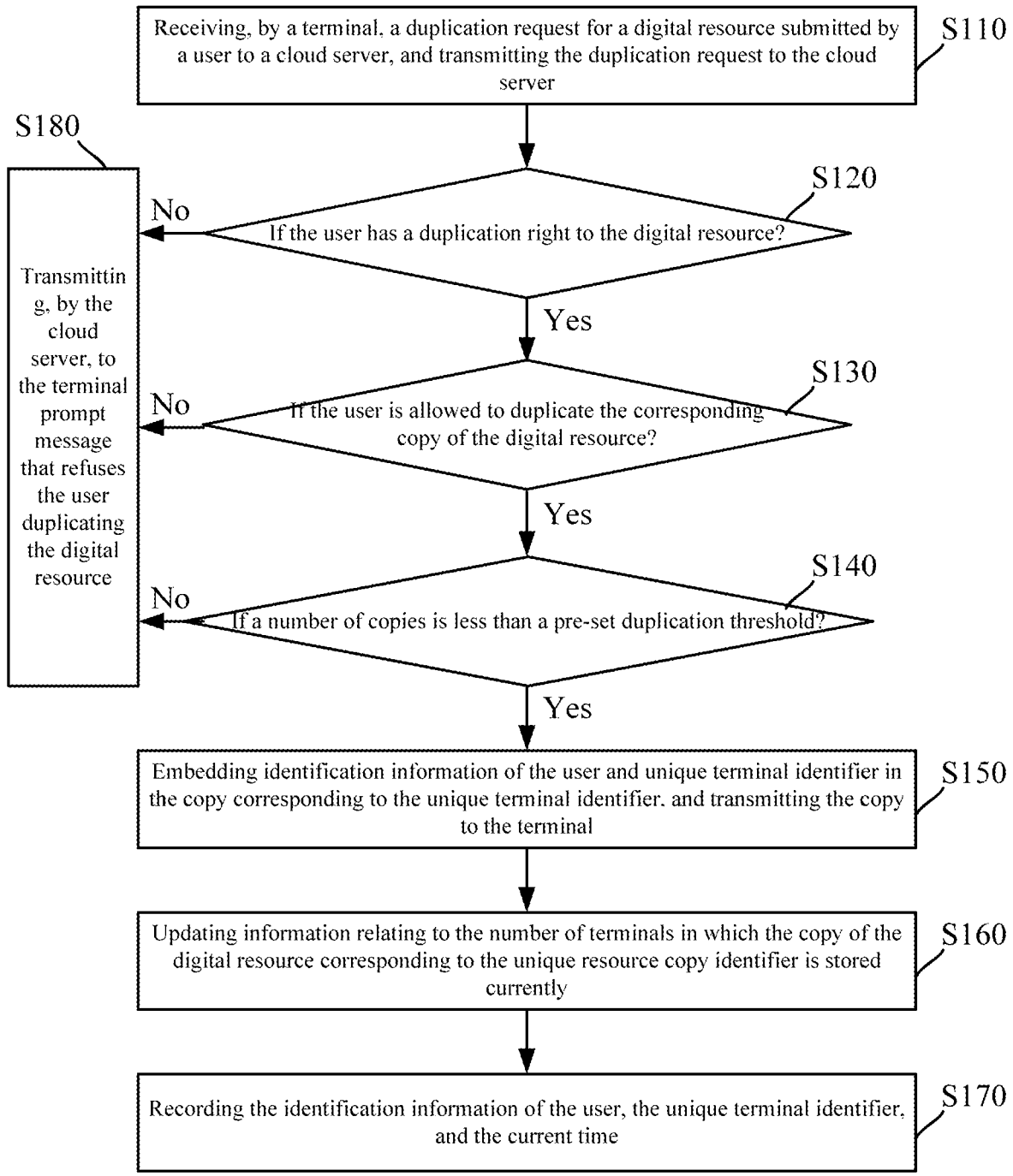
FIG. 1 is a flow chart of a method for duplicating a digital resource according to an embodiment of the present disclosure.

As shown in FIG. 1, according to the embodiment of the present disclosure, the method for duplicating a digital resource comprises the follow steps.

In step S110, a terminal receives a duplication request for a digital resource submitted by a user to a cloud server and transmits the duplication request to the cloud server. The duplication request comprises identification information of the user, a unique resource copy identifier, and a unique terminal identifier. The unique terminal identifier is used for distinguishing different terminals effectively.

It should be noted that, a user, a third party cooperation platform, an operation platform or system and other resource requesters all can submit the duplication request for the digital resource to the cloud server. However, for the sake of convenience, the present disclosure will be illustrated hereinafter taking the user serving as the resource requester as an example. In addition to the cloud server, the server can be a server in other network platforms.

According to the embodiment of the present disclosure, the user can obtain the unique resource copy identifier through purchasing, leasing or borrowing.

The cloud server can be a network platform consisting of more than one intelligent device provided by a digital resource operator in a cloud computing network.

According to the embodiment of the present disclosure, it can be seen that, each copy of the digital resource has a corresponding unique resource copy identifier, which can be referred to as a unique identifier for short. For a specific unique identifier, only a limited number of copies can be duplicated, wherein the number is equal to a pre-set duplication threshold. For example, if the pre-set duplication threshold corresponding to a specific unique identifier is 2, only two terminals are allowed to be stored with a copy of the digital resource corresponding to the unique identifier after the user obtains the unique identifier. The pre-set duplication threshold can be determined by a publisher or an operator, and can be one or plural. In other words, when a unique resource copy identifier is allocated to the user, it means that the user has a specific usage right to the digital resource corresponding to the unique resource copy identifier. The specific usage right means that the user can duplicate one copy or a plurality of copies (the number of the pre-set duplication threshold) of the digital resource.

In step S120, the cloud server receives the duplication request submitted by the user through the terminal, and determines whether the user has a duplication right to the digital resource through comparing the identification information of the user and the identification information stored in the cloud server. If a determination result is positive, step S130 is entered; if the determination result is negative, step S180 is entered.

In step S130, the cloud server determines whether the user is allowed to duplicate via the terminal a copy of the digital resource corresponding to the unique resource copy identifier according to the unique resource copy identifier in the duplication request. If the determination result is positive, step S140 is entered; if the determination result is negative, step S180 is entered.

In step S140, the cloud server obtains information relating to the number of terminals in which the copies of the digital resource corresponding to the unique resource copy identifier are stored currently (i.e., a number of copies) from a cloud end. If the number of copies of the unique resource copy identifier is less than a pre-set duplication threshold thereof, step S150 is entered; otherwise, step S180 is entered.

According to the embodiment of the present disclosure, the information relating to the number of terminals in which the copies of the digital resource corresponding to the unique resource copy identifier are stored currently can be obtained by the cloud server through defining a parameter of the number of copies to the unique resource copy identifier. The parameter of the number of copies represents the number of terminals in which the copies of the digital resource corresponding to the unique resource copy identifier are stored currently. When the copy of the digital resource corresponding to the unique resource copy identifier is duplicated by any terminal, 1 is added to a value of the parameter of the number of copies. Similarly, when the copy of the digital resource corresponding to the unique resource copy identifier is returned by any terminal, 1 is subtracted from the value of the parameter of the number of copies. In this manner, the number of terminals in which the copies of the digital resource corresponding to the unique resource copy identifier are stored currently can be obtained by the cloud server conveniently.

In addition, the information relating to the number of terminals in which the copies of the digital resource corresponding to the unique resource copy identifier are stored currently may be other kinds of information. The information relating to the number of terminals in which the copies of the digital resource corresponding to the unique resource copy identifier are stored currently can be obtained through recording the unique terminal identifiers of the terminals in which the copies of the digital resource corresponding to the unique resource copy identifier are stored currently, or through calculating a number of the unique terminal identifiers.

In step S150, the cloud server embeds the identification information of the user and the unique terminal identifier in the copy of the digital resource corresponding to the unique resource copy identifier in the duplication request, and transmits the copy to the terminal.

According to the embodiment of the present disclosure, the identification information of the user and the unique terminal identifier are embedded in the copy of the digital resource, whereby the digital resources being duplicated from a legitimate terminal to other terminals for use can be prevent effectively, and the illegal duplication of digital resources between terminals can be controlled.

In step S160, the cloud server updates the information relating to the number of terminals in which the copies of the digital resource corresponding to the unique resource copy identifier are stored currently. For example, the number of terminals in which the copies of the digital resource corresponding to the unique resource copy identifier are stored currently can be obtained through recording an interrelationship between the unique terminal identifier and the unique resource copy identifier. For another example, a variable which represents the number of terminals in which the copies of the digital resource corresponding to the unique resource copy identifier are stored currently can be defined, and 1 being added to the variable represents that one terminal in which the copy of the digital resource corresponding to the unique resource copy identifier is stored is added.

In step S170, the cloud server records the unique terminal identifier of the user, or the unique terminal identifier and at least one of the identification information and a current time. According to the embodiment of the present disclosure, the information can be recorded as the duplication record information of the digital resource.

In step S180, the cloud server transmits to the terminal prompt message that refuses the user duplicating digital resource. For example, if the identification information of the user in the duplication request is inconsistent with the identification information stored in the cloud end, the cloud server can transmit to the terminal prompt message that the identification information is illegal. For another example, if the cloud server determines that the user cannot duplicate via the terminal the copy of the digital resource corresponding to the unique resource copy identifier in the duplication request, the cloud server can transmit to the terminal prompt message that the user cannot duplicate the copy of the digital resource corresponding to the unique resource copy identifier in the duplication request. For a third example, if the number of copies of the unique resource copy identifier is larger than or equal to the pre-set duplication threshold thereof, the cloud server can transmit to the terminal prompt message that no residual copy of the digital resource is left currently.

According to the embodiment of the present disclosure, the user can return the usage right to the copy on his own initiative. The cloud server commands the terminal to delete the copy stored therein when receiving a returning request submitted by the resource requester via the terminal for returning the copy to a cloud end, and updates the information relating to the number of terminals in which the copies of the digital resource corresponding to the unique resource copy identifier are stored currently. That is, when the user returns the usage right to the copy on his own initiative, the cloud server returns the usage right to the copy to the cloud end of the digital resource owner. Therefore, a return log is generated and recorded, and the copy is deleted from the terminal of the user.

According to the embodiment of the present disclosure, when the pre-set duplication threshold is 1, only one terminal is allowed to use the copy corresponding to the unique identifier. If the user wants to use the copy in a second terminal, a first terminal should return the copy to the cloud end in advance. In this case, the cloud server updates the number of copies of the number of terminals in which the copies of the digital resource corresponding to the unique resource copy identifier are stored currently, so that the number of copies is 0. Only in this way, when the second terminal submits a duplication request for the copy, the condition that the number of copies is less than the pre-set duplication threshold can be met, and thus the second terminal is allowed to duplicate the copy from the cloud end.

As to the same digital resource, the terminals which are installed with Symbian system, iOS system of Apple Inc., Android system, Windows system, etc all can duplicate the copy. When the cloud server determines that the user can duplicate the copy of the digital resource, the cloud server embeds the identification information of the user and the unique terminal identifier in the copy, and then transmits the copy to the terminal.

No matter the user duplicates one copy of the digital resource through what kind of terminal, such as home appliances with data processing functions, computers including desktop PC, laptop, tablet personal computer, mobile phone, digital products, etc, 1 is subtracted from the number that the digital resource under the user's name can be duplicated. In this manner, not only the digital resources can be circulated and transmitted among terminals with different operating platforms, but also the security and controllability of the digital resources can be ensured.

According to the embodiment of the present disclosure, a duplication system of a digital resource mainly comprises a terminal and a cloud server, which can be understood in combination with the method for duplicating a digital resource as shown in FIG. 1.

In the duplication system, the terminal is used for receiving a duplication request for a digital resource submitted by a user to the cloud server and transmitting the duplication request to the cloud server, the duplication request comprising identification information of the resource requester, a unique resource copy identifier, and a unique terminal identifier.

In the duplication system, the cloud server is used for determining, after receiving the duplication request, on the basis of the identification information, whether the user is allowed to duplicate via the terminal a copy of the digital resource corresponding to the unique resource copy identifier, and embedding the identification information and the unique terminal identifier in the copy and transmitting the copy to the terminal when a determination result is positive.

In the duplication system according to the embodiment of the present disclosure, the cloud server is used for determining that the user is allowed to duplicate the copy of the digital resource corresponding to the unique resource copy identifier in the duplication request via the terminal when the user has a duplication right to the digital resource, and a number of copies of the unique resource copy identifier in the duplication request is less than a pre-set duplication threshold thereof.

In the duplication system according to the embodiment of the present disclosure, the cloud server is further used for recording, when the copy is transmitted to the terminal, the unique terminal identifier, or the unique terminal identifier and at least one of the identification information and a current time.

In the duplication system according to the embodiment of the present disclosure, the cloud server is further used for recording, when the copy is transmitted to the terminal, the unique terminal identifier, or the unique terminal identifier and at least one of the identification information and a current time.

In the duplication system according to the embodiment of the present disclosure, the cloud server is used for withdrawing the usage right to the copy from the terminal based on a returning request submitted by the user; and the terminal is used for receiving the returning request submitted by the resource requester to the cloud server and transmitting the returning request to the cloud server.

Figure 2:
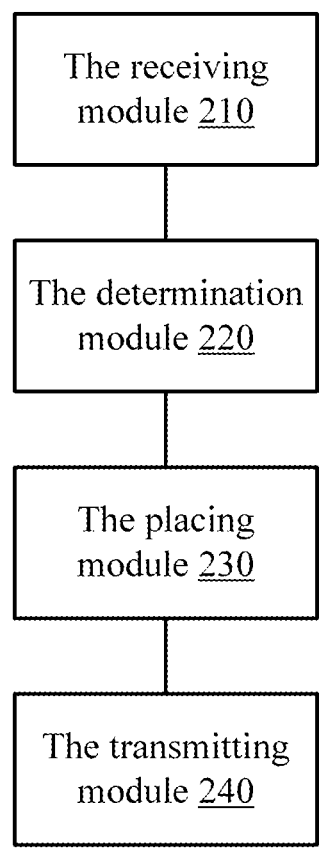
FIG. 2 schematically shows a structure of a cloud server according to the embodiment of the present disclosure.

In combination with the method for duplicating the digital resource as shown in FIG. 1, according to the embodiment of the present disclosure, the cloud server comprises a receiving module 210, a determination module 220, an embedding module 230, and a transmitting module 240, as shown in FIG. 2.

The receiving module 210 is used for receiving a duplication request for a digital resource submitted by a user via a terminal, the duplication request comprising identification information of the resource requester, a unique resource copy identifier, and a unique terminal identifier.

The determination module 220 is connected with the receiving module 210 and is used for determining, on the basis of the identification information, whether the user is allowed to duplicate via the terminal a copy of the digital resource corresponding to the unique resource copy identifier.

The embedding module 230 is connected with the determination module 220 and is used for embedding the identification information and the unique terminal identifier in the copy when it is determined by the determination module that the resource requester is allowed to duplicate the copy of the digital resource corresponding to the unique resource copy identifier via the terminal.

The transmitting module 240 is connected with the embedding module 230 and is used for transmitting the copy to the terminal.

According to the embodiment of the present disclosure, the determination module 220 can comprise:

a first determination unit, which is used for determining whether the user has a duplication right to the digital resource based on the identification information;

a second determination unit, which is connected with the first determination unit and is used for determining, when the first determination unit determines that the user has the duplication right to the digital resource, whether the user is allowed to duplicate the copy via the terminal; and a third determination unit, which is connected with the first determination unit and is used for determining whether a number of copies of the unique resource copy identifier is less than a pre-set duplication threshold thereof, the number of copies being a number of terminals in which the copies of the digital resource corresponding to the unique resource copy identifier are stored currently. The pre-set duplication threshold means that the terminals with a number equal to a value of the pre-set duplication threshold are allowed to be stored with the copy of the digital resource corresponding to the unique resource copy identifier at the same time.

According to the embodiment of the present disclosure, the server can comprise:

an updating module, which is used for updating, if the transmitting module 240 transmits the copy to the terminal, information relating to the number of terminals in which the copies of the digital resource corresponding to the unique resource copy identifier are stored currently.

According to the embodiment of the present disclosure, the server can comprise:

a recording module, which is used for recording, when the transmitting module 240 transmits the copy to the terminal, the unique terminal identifier, or the unique terminal identifier and at least one of the identification information and a current time.

According to the embodiment of the present disclosure, the server can comprise:

a returning module, which is used for commanding, when a returning request submitted by the resource requester via the terminal for returning the copy to a cloud end is received, the terminal to delete the copy stored therein, and updating the information relating to the number of terminals in which the copies of the digital resource corresponding to the unique resource copy identifier are stored currently. In this case, the usage right to the copy is withdrawn from the terminal, and the user is allowed to obtain the copy through other terminals.

The receiving module 210 is used for receiving the returning request submitted by the resource requester via the terminal.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A method for duplicating a digital resource, comprising the following steps executed by a cloud server:

receiving, in a receiving step, a duplication request for a digital resource submitted by a resource requester via a terminal, the duplication request comprising an identification information of the resource requester, a unique resource copy identifier, and a unique terminal identifier;

determining, in a determination step by a processor inside the cloud server, on the basis of the identification information, whether the resource requester is allowed to duplicate via the terminal a copy of the digital resource corresponding to the unique resource copy identifier; and transmitting, in a transmitting step, the copy to the terminal after the processor embedding the unique terminal identifier and the identification information in the copy, when a determination result of the determination step is positive, wherein when the resource requester is an operator, a pre-set duplication threshold of the unique resource copy identifier is determined by the resource requester.

2. The method according to claim 1, wherein the determination result of the determination step is positive when it is determined that the resource requester has a duplication right to the digital resource corresponding to the unique resource copy identifier based on the identification information, and that a number of copies of the unique resource copy identifier is less than the pre-set duplication threshold thereof, the number of copies being a number of terminals in which copies of the digital resource corresponding to the unique resource copy identifier are stored currently; and wherein the method further comprises updating, in an updating step, if the copy is transmitted to the terminal, information relating to the number of terminals in which the copies of the digital resource corresponding to the unique resource copy identifier are stored currently.

3. The method according to claim 2, further comprising:

recording, in a recording step, if the copy is transmitted to the terminal, the unique terminal identifier, or the unique terminal identifier and at least one of the identification information and a current time.

4. The method according to claim 2, further comprising:

commanding, by the processor inside the cloud server, when the cloud server receives a returning request submitted by the resource requester via the terminal for returning the copy to a cloud end, the terminal to delete the copy stored therein; and updating the information relating to the number of terminals in which the copies of the digital resource corresponding to the unique resource copy identifier are stored currently.

5. The method according to claim 1, further comprising:

recording, in a recording step, if the copy is transmitted to the terminal, the unique terminal identifier, or the unique terminal identifier and at least one of the identification information and a current time.

6. The method according to claim 1, further comprising:

commanding, by the processor inside the cloud server, when the cloud server receives a returning request submitted by the resource requester via the terminal for returning the copy to a cloud end, the terminal to delete the copy stored therein; and updating the information relating to the number of terminals in which the copies of the digital resource corresponding to the unique resource copy identifier are stored currently.

* * * * *